United States Patent
Nakamura

(10) Patent No.: US 8,485,444 B2
(45) Date of Patent: Jul. 16, 2013

(54) APPARATUS AND METHOD FOR READING SYMBOL INFORMATION

(75) Inventor: Hiroshi Nakamura, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 232 days.

(21) Appl. No.: 13/018,814

(22) Filed: Feb. 1, 2011

(65) Prior Publication Data

US 2011/0186637 A1 Aug. 4, 2011

(30) Foreign Application Priority Data

Feb. 1, 2010 (JP) .................................. 2010-020192

(51) Int. Cl.
*G06K 7/10* (2006.01)

(52) U.S. Cl.
USPC .................. 235/455; 235/462.27; 235/462.28; 235/462.11

(58) Field of Classification Search
USPC ................... 235/455, 462.27, 462.28, 462.11
See application file for complete search history.

(56) References Cited

U.S. PATENT DOCUMENTS

| 6,164,542 | A | * | 12/2000 | Ackley | 235/462.16 |
| 2011/0297746 | A1 | * | 12/2011 | Biss et al. | 235/462.2 |
| 2012/0193427 | A1 | * | 8/2012 | Al-Hussein et al. | 235/462.11 |
| 2012/0193431 | A1 | * | 8/2012 | Hawley et al. | 235/472.01 |

FOREIGN PATENT DOCUMENTS

| JP | 08-202804 | 8/1996 |
| JP | 2005-165949 | 6/2005 |

* cited by examiner

*Primary Examiner* — Allyson Trail
(74) *Attorney, Agent, or Firm* — Frommer Lawrence & Haug LLP

(57) ABSTRACT

An apparatus and method for reading symbol information enabling improvement of decoding accuracy, not being affected by the condition of a reflection coefficient waveform of a reflected light beam and the kind of symbol information to be read. The method includes: reading a reflected light beam from symbol information irradiated with a light beam; detecting peak values in a reflection coefficient waveform of the reflected light beam; calculating a first peak value according to a peak value at a high reflection coefficient side (white level) among the peak values detected; calculating a second peak value according to a peak value at a low reflection coefficient side (black level) among the peak values detected; and calculating a binarization threshold based on the first peak value and the second peak value.

8 Claims, 6 Drawing Sheets

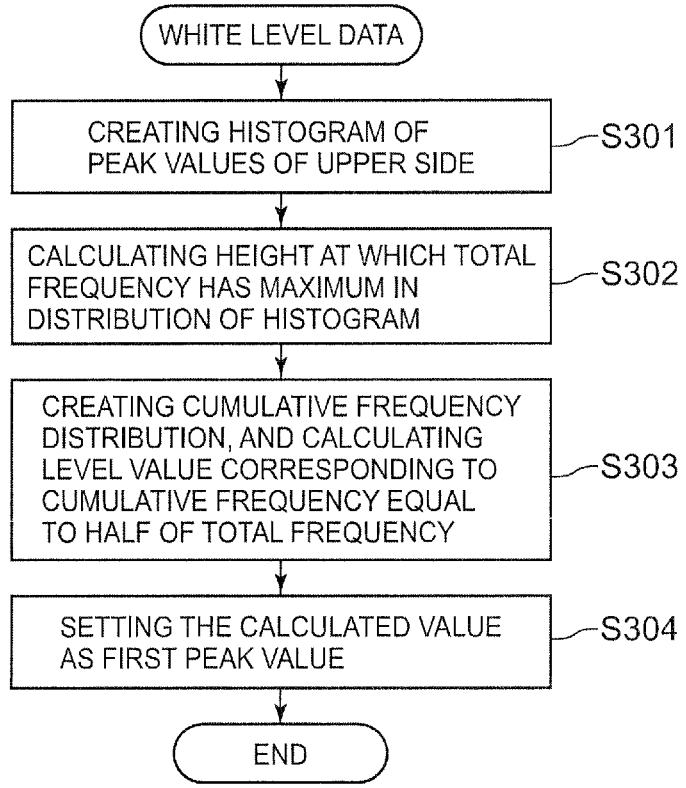
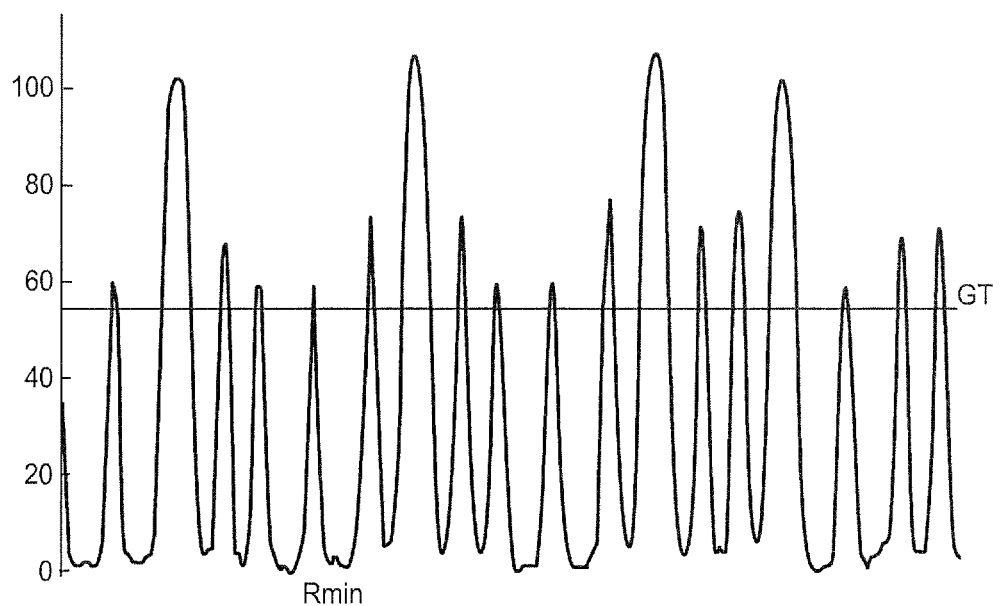

APPARATUS AND METHOD FOR READING SYMBOL INFORMATION

The present application claims priority from Japanese Patent Application No. 2010-020192 filed on Feb. 1, 2010, the disclosure of which is incorporated herein by reference in its entirety.

BACKGROUND OF THE INVENTION

1. Field of the Invention

The present invention relates to apparatuses and methods for reading symbol information that optically read symbol information such as a barcode.

2. Description of Related Art

Conventionally, barcodes have widely been used as measures for automatically recognizing identification information specific to an object, while the identification information having been provided to the object. Such a barcode includes a series of black-and-white sections that are called white level elements (spaces) and black level elements (black bars). For example, in the case of a barcode attached to a commodity, a light beam is radiated to the barcode for a barcode reading apparatus such as a laser scanner, a CCD camera, and the like to scan a light beam. A photo acceptance unit receives a light beam reflected from the white level elements (spaces) and black level elements (black bars), and then the reflected light beam received is photo-electrically converted for reading a variation in the reflection coefficient of the reflected light beam as multi-valued information. Generally, the multi-valued information is binarized with a predetermined threshold and then subsequently decoded.

FIG. 10 shows an example of a conventional way of binarization. The method shown in FIG. 10 is described in Japanese Industrial Standards JIS X502; and it is specified in the method that, for example in a (scanned) reflection coefficient waveform shown in FIG. 11, a maximum reflection coefficient Rmax and a minimum reflection coefficient Rmin are obtained, and then a binarization threshold GT is calculated by means of a formula shown below:

$$GT=(R\mathrm{max}+R\mathrm{min})/2$$

On this occasion, the (scanned) reflection coefficient waveform is a waveform that is created by dotting the reflection coefficient along a line in a direction scanning direction) intersecting the white level elements and black level elements constituting a barcode; and it is a waveform, for example, such as what FIG. 11 shows.

In the (scanned) reflection coefficient waveform shown in FIG. 11, an element judgment is made so as to assume a part with an output level exceeding the binarization threshold GT to be a white level (a space), and meanwhile a part with an output level failing below the binarization threshold GT to be a black level element (a black bar); and then a decoding operation progresses in this way.

In reality, the (scanned) reflection coefficient waveform changes in various ways, depending on printing conditions of the barcode, resolution performance of the barcode reading optical system, fluctuation in the transfer speed of the recording medium. Especially, when the conventional calculation method of binarization threshold is applied to a (scanned) reflection coefficient waveform shown in FIG. 7, the binarization threshold GT is set at a position closer to the white levels (spaces) so that precise judgment on a white/black level unfavorably becomes impossible. In the case of the (scanned) reflection coefficient waveform shown in FIG. 7, the Rmax and Rmin are 108 and 0, respectively, to make the binarization threshold GT equal to 54, and therefore the binarization threshold is set at a position closer to the white levels (spaces), as shown in FIG. 7. Accordingly, it is likely that a range for the white levels (spaces) becomes narrower than it should actually be; meanwhile a range for the black levels (bars) becomes wider than it should actually be. As a result, the conventional method has a tendency to cause a decoding error, namely to make a reading mistake.

There have been tried various improvements for further enhancing the reading accuracy of barcode reading apparatuses by dealing with these problems (e.g., refer to Japanese Unexamined Patent Application Publication No. H08-202804 ("JP H08-202804") and Japanese Unexamined Patent Application Publication No. 2005-165949 ("JP 2005-165949")).

JP H08-202804 discloses a provision of a function in which an electric output signal created by photo-electrically converting a reflected light beam from a barcode is amplified with a predetermined gain and meanwhile the gain of the amplifier is suitably adjusted in accordance with a signal level difference between a black level (a bar) and a white level (a space) in a barcode reading apparatus having a binarization function of the amplified reflection output signal ((scanned) reflection coefficient waveform).

JP 2005-165949 discloses a fine adjustment of a binarization threshold in accordance with a decoding result through modification of an initial value of the binarization threshold in order for re-decoding operation, in a barcode reading apparatus in which image information of a barcode developed as multi-valued information is binarized and decoded for each pixel with the predetermined threshold.

In the barcode reading apparatus disclosed in JP H08-202804, the gain of a signal amplitude is adjusted for stabilizing the accuracy of binarization according to the deviation of average values of black levels and white levels in the scanned reflection output signal (scanned) reflection coefficient waveform). However, in this case, the fluctuation in amplitude of the white levels sometimes becomes large, depending on the condition of the scanned reflection output signal or the kind of barcode to be read so that the deviation of the average values, being an important factor, becomes inaccurate. As a result, unfortunately the accuracy of binarization becomes worsened.

Meanwhile, in the barcode reading apparatus disclosed in JP 2005-165949, after the initial value of the binarization threshold is once calculated, the binarization threshold is modified through a prescribed method and the decoding operation is repeated until the decoding operation becomes settled. Then, unfortunately the processing time becomes excessively long, depending on the condition of the input signal.

SUMMARY OF THE INVENTION

It is an object of the present invention to provide an apparatus and method for reading symbol information; the apparatus and method being unlikely affected by the condition of the (scanned) reflection coefficient waveform and the kind of symbol information to be read, so as to enable the improvement of decoding accuracy.

To achieve the objects described above, the present invention provides the following aspects.

(1) An apparatus for reading symbol information including: a reading means for reading a reflected light beam out of symbol information irradiated with a light beam; a peak detecting means for detecting peak values in a reflection coefficient waveform of the reflected light beam read by the reading means; a first peak value calculating means for calculating a first peak value according to a peak value at a high reflection coefficient side among the peak values detected; a second peak value calculating means for calculating a second peak value according to a peak value at a low reflection coefficient side among the peak values detected; and a binarization threshold calculating means for calculating a binarization threshold based on the first peak value and the second peak value.

According to the present invention; through procedures of detecting peak values in a reflection coefficient waveform of a reflected light beam that has been read; calculating a first peak value for a binarization threshold according to a peak value at a high reflection coefficient (white level) side; calculating a second peak value for the binarization threshold according to a peak value at a low reflection coefficient (black level) side; and calculating a binarization threshold based on the first peak value and the second peak value; it is possible to obtain the binarization threshold that is unlikely affected by the fluctuation in amplitude of white levels, depending on the condition of the reflection coefficient waveform and the kind of symbol information to be read, so as to enable improvement in accuracy of decoding the symbol information.

Accordingly, since the symbol information reading apparatus according to the present invention calculates an appropriate binarization threshold, based on peak values in a reflection coefficient wave, the binarization accuracy does not deteriorate even though the fluctuation in amplitude of white levels is large, depending on the condition of the reflection coefficient waveform and the kind of symbol information to be read. Therefore, an error of reading symbol information can be avoided, and decoding operation can be carried out for sure.

(2) The apparatus for reading symbol information, wherein the first peak value calculating means calculates the first peak value according to a cumulative frequency distribution of peak values at the high reflection coefficient side.

According to the present invention, the first peak value for the binarization threshold is calculated according to a cumulative frequency distribution of peak values at the high reflection coefficient side (white levels). Therefore, even if the fluctuation in amplitude of white levels is large, depending on the condition of the reflection coefficient waveform and the kind of symbol information to be read, the first peak value can be calculated appropriately so as to enable improvement in accuracy of binarization.

(3) The apparatus for reading symbol information: wherein, if a histogram of the peak values at the high reflection coefficient side includes a plurality of heights, the first peak value calculating means creates a cumulative frequency distribution of a height area at which the total frequency has a maximum, and then calculates the first peak value according to the cumulative frequency distribution.

According to the present invention; if a histogram of the peak values at the high reflection coefficient side includes a plurality of heights, the first peak value can be calculated appropriately according to the cumulative frequency distribution of a height area at which the total frequency has a maximum so as to enable improvement in accuracy of binarization.

(4) The apparatus for reading symbol information: wherein the binarization threshold is a value calculated by proportionally dividing the first peak value and the second peak value with a predetermined ratio.

According to the present invention, the binarization threshold is calculated by proportionally dividing the first peak value and the second peak value with a predetermined ratio, wherein the first peak value and the second peak value being calculated according to peak values at a high reflection coefficient (white level) side and a low reflection coefficient (black level) side, respectively. Therefore, it is possible to obtain the binarization threshold that is unlikely affected by the fluctuation in amplitude, depending on the condition of the reflection coefficient waveform and the kind of symbol information to be read, so as to enable improvement in accuracy of decoding the symbol information.

(5) The apparatus for reading symbol information further including a smoothing means for removing a faint noise out of the reflection coefficient waveform read by the reading means.

According to the present invention, a faint noise is removed out of the reflection coefficient waveform, and then the peak values are detected in the smoothed reflection coefficient waveform, so as to enable further improvement in accuracy of binarization.

(6) A method for reading symbol information including: a first step of reading a reflected light beam out of symbol information irradiated with a light beam, and detecting peak values in a reflection coefficient waveform of the reflected light beam; a second step of calculating a first peak value according to a peak value at a high reflection coefficient side among the peak values detected; a third step of calculating a second peak value according to a peak value at a low reflection coefficient side among the peak values detected; and a fourth step of calculating a binarization threshold based on the first peak value and the second peak value.

According to the present invention; through procedures of detecting peak values in a reflection coefficient waveform of a reflected light beam that has been read; calculating a first peak value for a binarization threshold according to a peak value at a high reflection coefficient (white level) side; calculating a second peak value for the binarization threshold according to a peak value at a low reflection coefficient (black level) side; and calculating a binarization threshold based on the first peak value and the second peak value; it is possible to obtain the binarization threshold that is unlikely affected by the fluctuation in amplitude of white levels, depending on the condition of the reflection coefficient waveform and the kind of symbol information to be read, so as to enable improvement in accuracy of decoding the symbol information.

Then, since the symbol information reading method according to the present invention calculates an appropriate binarization threshold, based on peak values, the binarization accuracy does not deteriorate even though the fluctuation in amplitude of white levels is large, depending on the condition of the reflection coefficient waveform and the kind of barcode to be read. Therefore, an error of reading symbol information can be avoided, and decoding operation can be carried out for sure.

(7) The method for reading symbol information: wherein the second step calculates the first peak value according to the cumulative frequency distribution of the peak values at the high reflection coefficient side.

According to the present invention, the first peak value for the binarization threshold is calculated according to a cumulative frequency distribution of peak values at the high reflection coefficient side (white levels). Therefore, even if the fluctuation in amplitude of white levels is large, depending on the condition of the reflection coefficient waveform and the kind of symbol information to be read, the first peak value can be calculated appropriately so as to enable improvement in accuracy of binarization.

(8) The method for reading symbol information: wherein, if a histogram of the peak values at the high reflection coefficient side includes a plurality of heights, the second step creates a cumulative frequency distribution of a height area at which the total frequency has a maximum, and then calculates the first peak value according to the cumulative frequency distribution.

According to the present invention; if a histogram of the peak values at the high reflection coefficient side includes a plurality of heights, the first peak value can be calculated appropriately according to the cumulative frequency distribution of a height area at which the total frequency has a maximum so as to enable improvement in accuracy of binarization.

(9) The method for reading symbol information: wherein the fourth step calculates the binarization threshold by proportionally dividing the first peak value and the second peak value with a predetermined ratio.

According to the present invention, the binarization threshold is calculated by proportionally dividing the first peak value and the second peak value with a predetermined ratio, wherein the first peak value and the second peak value being calculated according to peak values at a high reflection coefficient (white level) side and a low reflection coefficient (black level) side, respectively. Therefore, it is possible to obtain the binarization threshold that is unlikely affected by the fluctuation in amplitude, depending on the condition of the reflection coefficient waveform and the kind of symbol information to be read, so as to enable improvement in accuracy of decoding the symbol information.

(10) The method for reading symbol information: wherein the first step removes a faint noise out of the read reflection coefficient waveform, and detects the peak values in the smoothed reflection coefficient waveform.

According to the present invention, a faint noise is removed out of the reflection coefficient waveform, and then the peak values are detected in the smoothed reflection coefficient waveform, so as to enable further improvement in accuracy of binarization.

ADVANTAGEOUS EFFECT OF THE INVENTION

As described above, an apparatus and method for reading symbol information according to the present invention detects peak values in a reflection coefficient waveform of a reflected light beam that has been scanned; calculates a first peak value for a binarization threshold according to a peak value at a high reflection coefficient (white level) side; calculates a second peak value for the binarization threshold according to a peak value at a low reflection coefficient (black level) side; and calculates a binarization threshold based on the first peak value and the second peak value. As a result, through these procedures, the apparatus and method for reading symbol information can obtain the binarization threshold that is unlikely affected by the fluctuation in amplitude of white levels, depending on the condition of the reflection coefficient waveform and the kind of symbol information to be read, so as to enable improvement in accuracy of decoding the symbol information.

BRIEF DESCRIPTION OF THE DRAWINGS

FIG. 6 is a flowchart showing another example of calculating "a first peak value" in the flowchart shown in FIG. 2.

FIG. 7 shows an example of a reflection coefficient waveform of a reflected light beam out of symbol information.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Symbol Information Reading Apparatus

Figure 1:
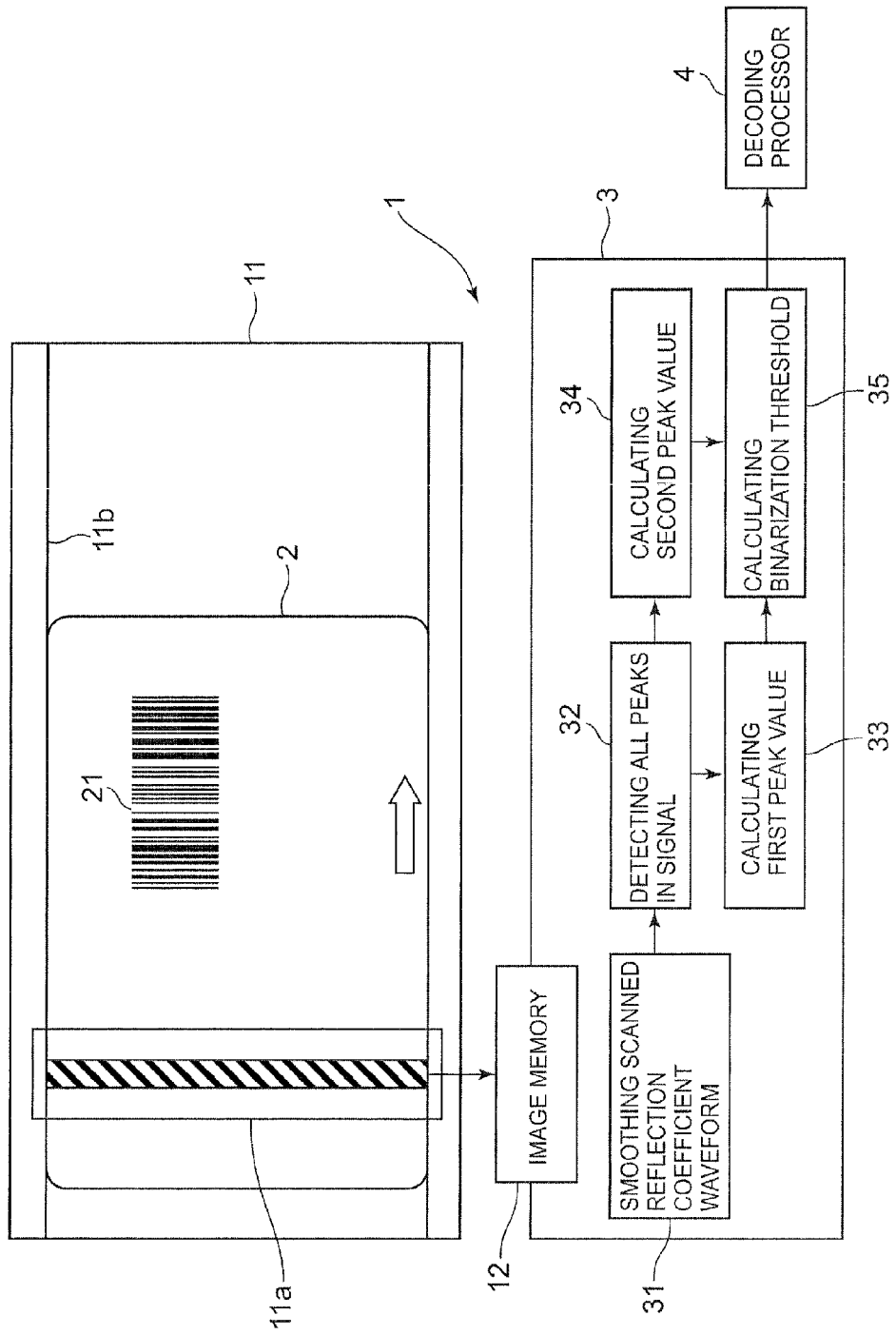
FIG. 1 is a block diagram showing an electrical structure of a symbol information reading apparatus of an embodiment according to the present invention.

FIG. 1 is a block diagram showing an electrical structure of a symbol information reading apparatus 1 of an embodiment according to the present invention.

In FIG. 1, the symbol information reading apparatus 1 includes: an imaging apparatus 11 having a contact-type one-dimensional imaging element 11a and a medium transfer mechanism (including a transfer guide 11b); an image memory 12; a data processor 3; and a decoding processor 4. The data processor 3 includes a smoothing processor 31, a peak detecting section 32, a first peak value calculating section 33, a second peak value calculating section 34, and a binarization threshold calculating section 35.

In the present embodiment, the symbol information is a barcode 21, as shown in FIG. 1. The barcode 21 is composed of a series of black-and-white sections that are called white level elements (spaces) and black level elements (black bars), meanwhile these elements are rectangular and each of the elements has a specific width dimension. The barcode 21 printed on a recording medium 2, such as a card, is transferred along the transfer guide lib of the medium transfer mechanism at a constant speed. When the barcode 21 passes over the one-dimensional imaging element 11a, information printed on a surface of the recording medium 2 including the barcode 21 is photo-electrically converted, and captured into the image memory 12 as image data of multi-valued information showing reflection coefficients.

More concretely to describe, the imaging apparatus 11 receives a reflected light beam out of the surface of the recording medium 2 to convert it into an analog electrical signal, and then converts a value of the analog electrical signal (i.e., a value indicating brightness) into digital multi-valued information. For example, in the case where the analog electrical signal is converted into 8-bit digital multi-valued information, the brightness that the analog electrical signal indicates can be converted into a 256-gray-level brightness value (a brightness value expressed with an integer within the range from 0 to 255). While the medium transfer mechanism transfers the recording medium 2 at a constant speed, the contact-type one-dimensional imaging element 11a captures image data composed of 2D array pixels. The image data includes information printed on the recording medium 2, the information being included in the image data of the barcode 21. Then, a predetermined image processing operation (preprocessing) is executed on the captured image data to cut out a part of the barcode 21 and obtain the image data of the barcode 21, and then the image data is saved in the image memory 12.

The symbol information reading apparatus 1 scans one or more images around at a middle part in a widthwise direction (a direction perpendicular to a transfer direction of the recording medium 2 shown in FIG. 1) of the image data of the barcode 21, and then creates a (scanned) reflection coefficient waveform shown in FIG. 7 according to reflection coefficients (average values are used if multiple images are taken) composed of multi-valued information under the condition.

In the present embodiment, a brightness value at each pixel is used instead of a (scanned) reflection coefficient as described above. Namely, a vertical axis in FIG. 7 shows brightness values (in the range from 0 to 255) corresponding to scanned reflection coefficients. A bottom of the figure is provided with a brightness value of 0, representing a black level element (a bar) with a low reflection coefficient. Meanwhile, a top of the figure has a brightness value of 255, representing a white level element (a space) with a high reflection coefficient. A horizontal axis in FIG. 7 shows distances from a front end (a left end) to a tail end (a right end) of the barcode 21 in a scanning direction.

Furthermore, in the present embodiment, the number of pixels counted from the front end is used as a value for indicating a distance. Incidentally, though only a single line of pixels corresponding to a scanning line may be used as a line of pixels for measurement, it is also possible to use multiple lines of pixels positioned around the scanning line. When multiple lines of pixels are used, the vertical axis may represent either an average or a total of brightness values at the multiple pixels corresponding to the position.

In the embodiment described with reference to the drawings, the smoothing processor 31 of the data processor 3 smoothes the (scanned) reflection coefficient waveform by using a publicly-know means, such as the moving average, for removing a faint noise out of the reflection coefficient waveform.

The peak detecting section 32 is able to detect all of upper and lower peak values included in the (scanned) reflection coefficient waveform, and save their (pixel) positions, level values (brightness values), and polarities (convex either upward or downward) in the image memory 12.

Figure 8:
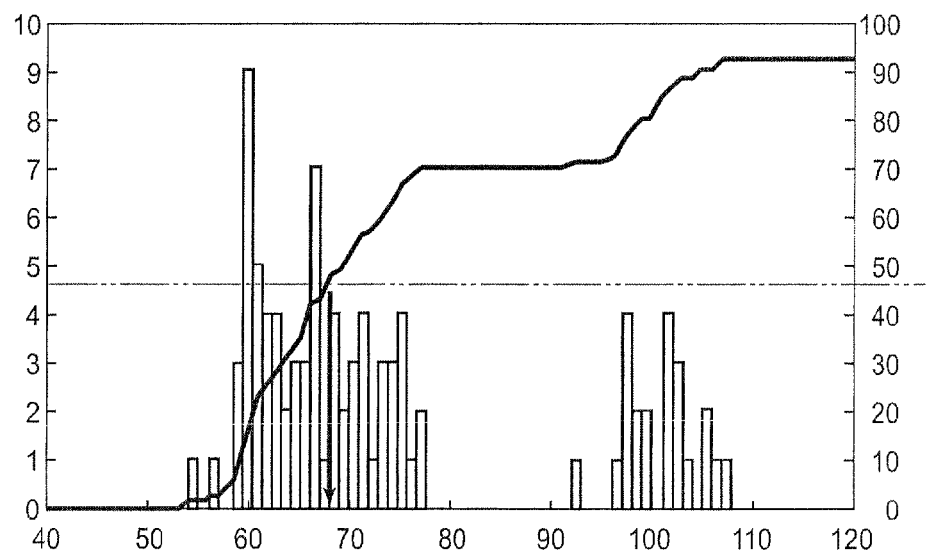
FIG. 8 is a diagram showing a histogram and a cumulative frequency distribution of positive peak values in the reflection coefficient waveform shown in FIG. 7.

In the present embodiment, the first peak value calculating section 33 includes a histogram creating means to create a histogram, and a cumulative frequency distribution creating means to create a cumulative frequency distribution, aiming at all peak values at the high reflection coefficient side (values at peaks being convex upward; parts corresponding to white levels having high reflection coefficients (high brightness values)) among all the peak values saved in the image memory 12. FIG. 8 is a diagram showing a histogram and a cumulative frequency distribution of the peak values at the high reflection coefficient side. Since multiple types of element width are generally used in the barcode 21, an output variation arises due to an arrangement of bar width so that a plurality of heights are formed in the histogram.

A horizontal axis in FIG. 8 represents peak values (brightness values) of the reflection coefficients, within the range from a brightness value 0 (a black level) to 255 (a white level) corresponding to the reflection coefficients. Meanwhile, in FIG. 8, a left vertical axis and a right vertical axis represent frequencies of peak values and cumulative frequencies of peak values at each reflection coefficient, respectively.

The first peak value calculating section 33 sets a first peak value between a minimum level value with a frequency greater than 0 and a maximum level value, according to all the peak values at the high reflection coefficient side so as to enable correcting a deviation of a binarization threshold. In the case of an example shown in FIG. 8, the first peak value calculating section 33 calculates a first peak value, according to a cumulative frequency distribution of all the peak values at the high reflection coefficient side; namely to set the first peak value with a value of 68, being a level value of a reflection coefficient at which a cumulative frequency is a half (46) of the ultimate value (the total frequency of 92). Needless to describe, the first peak value calculating section 33 can adjust a position of the value, according to circumstances. Namely, the first peak value (68) is a maximum reflection coefficient Rmax.

On the other hand, the second peak value calculating section 34 includes a histogram creating means to create a histogram, and a cumulative frequency distribution creating means to create a cumulative frequency distribution, aiming at all peak values at the low reflection coefficient side (values at peaks being convex downward; parts corresponding to black levels having low reflection coefficients (low brightness values)) among all the peak values (brightness values) saved in the image memory 12.

The second peak value calculating section 34 sets a second peak value between a minimum level value with a frequency greater than 0 and a maximum level value, according to all the peak values at the low reflection coefficient side. Though not being illustrated in the drawings, the second peak value is set with a minimum level value (0) in the present embodiment. Namely, the second peak value (0) is a minimum reflection coefficient Rmin.

The binarization threshold calculating section 35 calculates a binarization threshold by proportionally dividing the first peak value and the second peak value with a predetermined ratio. In the present embodiment, the first peak value (68) and the second peak value (0) are added, and then the sum calculated is divided by 2 so as to set a binarization threshold with the calculation result, namely with a value of 34. In a (scanned) reflection coefficient waveform, the binarization threshold GT is set at a position shown in FIG. 9. Thus, it is understood that the binarization threshold is placed at a position which is more appropriate than that of the conventional method (shown in FIG. 7). Namely, as described above, the binarization threshold GT shown in FIG. 7 is 54, being a value that is close to some of the peak values at the high reflection coefficient side (values at peaks being convex upward; parts corresponding to white levels having high reflection coefficients (high brightness values)) representing the first peak value.

The decoding processor 4 executes binarization on the (scanned) reflection coefficient waveform by using the binarization threshold calculated by the binarization threshold calculating section 35, and then executes decoding operation according to the width-wise arrangement condition of black level elements (bars) and white level elements (spaces) in order to output the operation result. Thus, in the symbol information reading apparatus 1, the binarization threshold is placed at an appropriate position so that the decoding operation can be executed more precisely.

Symbol Information Reading Method

Figure 2:
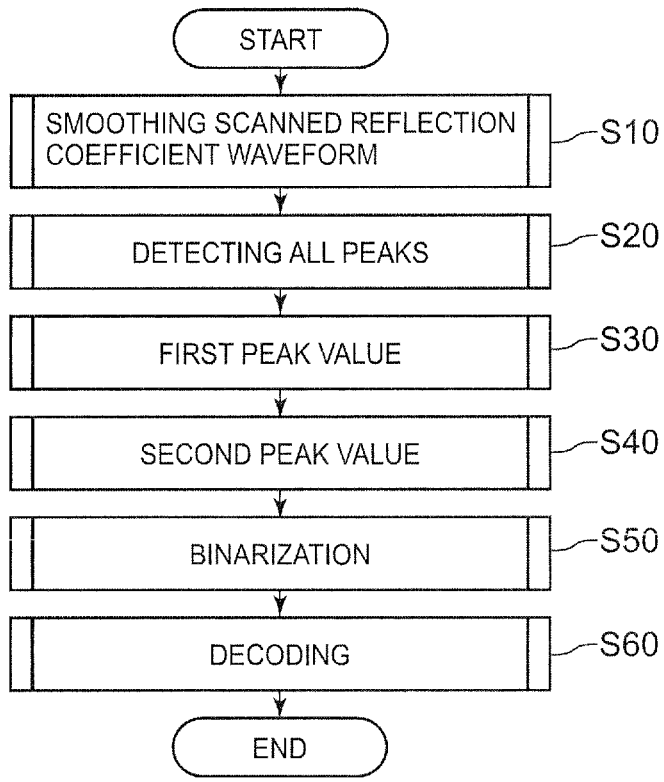
FIG. 2 is a flowchart showing a general workflow of a method for reading symbol information of the embodiment according to the present invention.

FIG. 2 to FIG. 5 are flowcharts showing a workflow of a symbol information reading method of the embodiment according to the present invention As shown in FIG. 2, the smoothing processor 31 smoothes the (scanned) reflection coefficient waveform of image data of the multi-valued information of the barcode 21, which the imaging apparatus 11 has captured, by using a publicly-know means, such as the moving average, for removing a faint noise out of the reflection coefficient waveform (S10).

The peak detecting section 32 detects all of upper and lower peak values included in the (scanned) reflection coefficient waveform, and saves their positions (pixel positions), level values (brightness values), and polarities in the image memory 12 (S20).

The first peak value calculating section 33 calculates a first peak value according to all the peak values at the high reflection coefficient side (S30).

Figure 3:
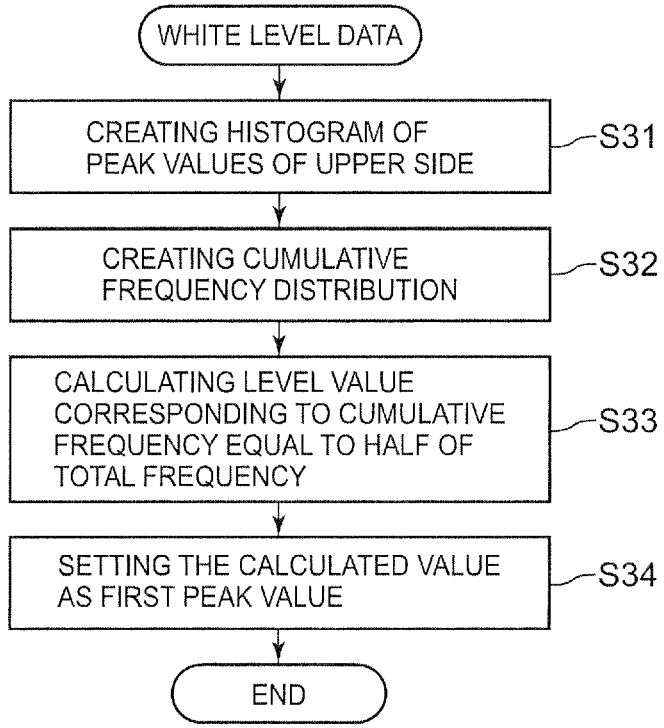
FIG. 3 is a flowchart showing a workflow of calculating "a first peak value" in the flowchart shown in FIG. 2.

Concretely to describe, as shown in FIG. 3, the first peak value calculating section 33 extracts any peak value provided with an indicator of being convex upward (a part corresponding to a white level having a high reflection coefficient (a high brightness value)) out of the peak values saved in the image memory 12, and then creates a histogram of peak values being convex upward (S31).

The first peak value calculating section 33 creates a cumulative frequency distribution of the peak values of being convex upward (S32). Then, the first peak value calculating section 33 calculates a level value (namely, 68) of a reflection coefficient (a brightness value) at which a cumulative frequency is a half (46) of the ultimate value (the total frequency of 92), and sets a first peak value with the level value of 68 (S33 and S34).

Next, the second peak value calculating section 34 calculates a second peak value according to all the peak values at the low reflection coefficient side (S40).

Figure 4:
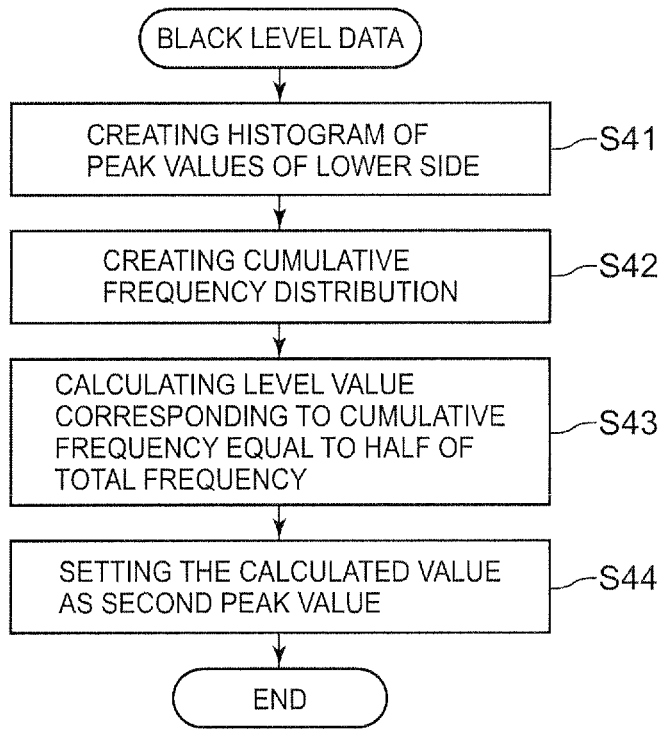
FIG. 4 is a flowchart showing a workflow of calculating "a second peak value" in the flowchart shown in FIG. 2.

Concretely to describe, as shown in FIG. 4, the second peak value calculating section 34 extracts any peak value provided with an indicator of being convex downward (a part corresponding to a black level having a low reflection coefficient) out of the peak values saved in the image memory 12, and then creates a histogram of peak values being convex downward (S41).

The second peak value calculating section 34 creates a cumulative frequency distribution of the peak values of being convex downward (S42). Then, second peak value calculating section 34 calculates a level value of a reflection coefficient (a brightness value) at which a cumulative frequency is a half of the ultimate value (the total frequency), and sets a second peak value with the level value (S43 and S44). Incidentally, since the fluctuation in amplitude of a low reflection coefficient (a black level) is smaller than that of a high reflection coefficient (a white level), it is possible to set the second peak value with a minimum level value (i.e., 0) on the assumption that all the peak values (brightness values) at the low reflection coefficient side are 0.

Next, the binarization threshold calculating section 35 calculates a binarization threshold GT according to the first peak value and the second peak value (S50).

Figure 5:
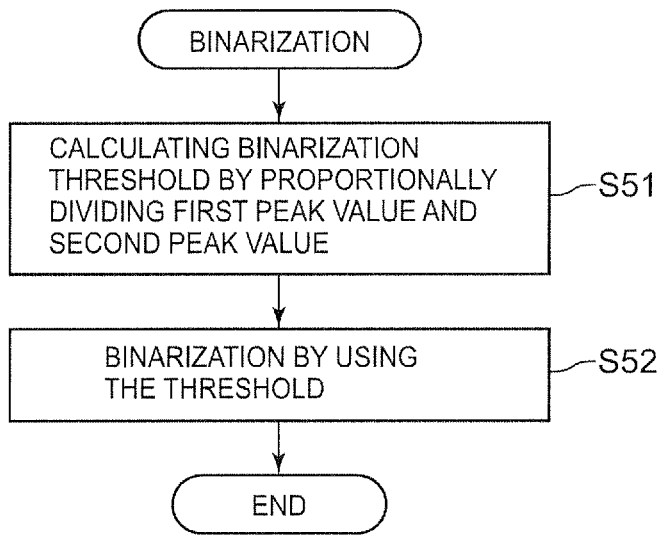
FIG. 5 is a flowchart showing a workflow of "binarization" in the flowchart shown in FIG. 2.

Concretely to describe, as shown in FIG. 5, the binarization threshold calculating section 35 calculates a binarization threshold GT by proportionally dividing the first peak value and the second peak value with a predetermined ratio (S51). In the present embodiment, the first peak value and the second peak value are added, and then the sum calculated is divided by 2 so as to set a binarization threshold GT with the calculation result. Then, the decoding processor 4 executes binarization on the (scanned) reflection coefficient waveform by using the binarization threshold GT calculated by the binarization threshold calculating section 35 (S52).

In the end, the decoding processor 4 executes decoding operation according to the width-wise arrangement condition of black level elements (bars) and white level elements (spaces) in order to output the operation result (S60).

Figure 9:
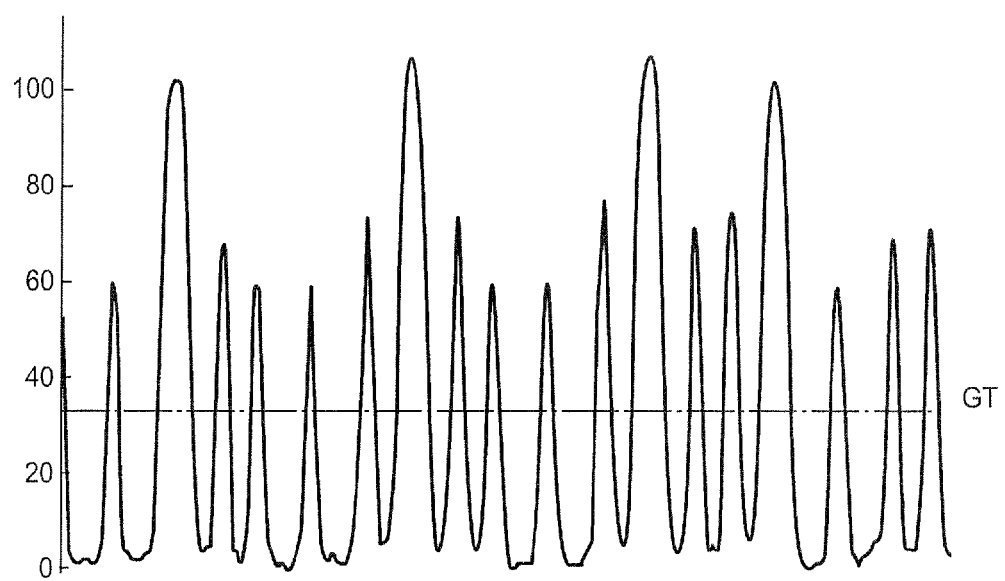
FIG. 9 shows a threshold obtained by means of the method for reading symbol information of the embodiment according to the present invention.
Figure 10:
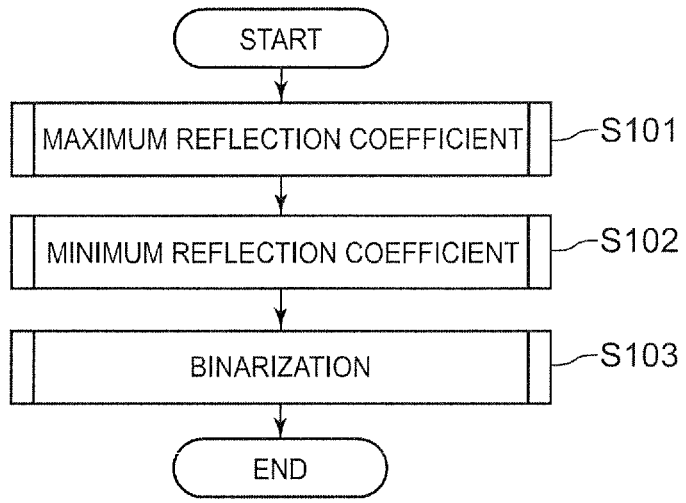
FIG. 10 is a flowchart showing a workflow of a conventional method for reading symbol information.
Figure 11:
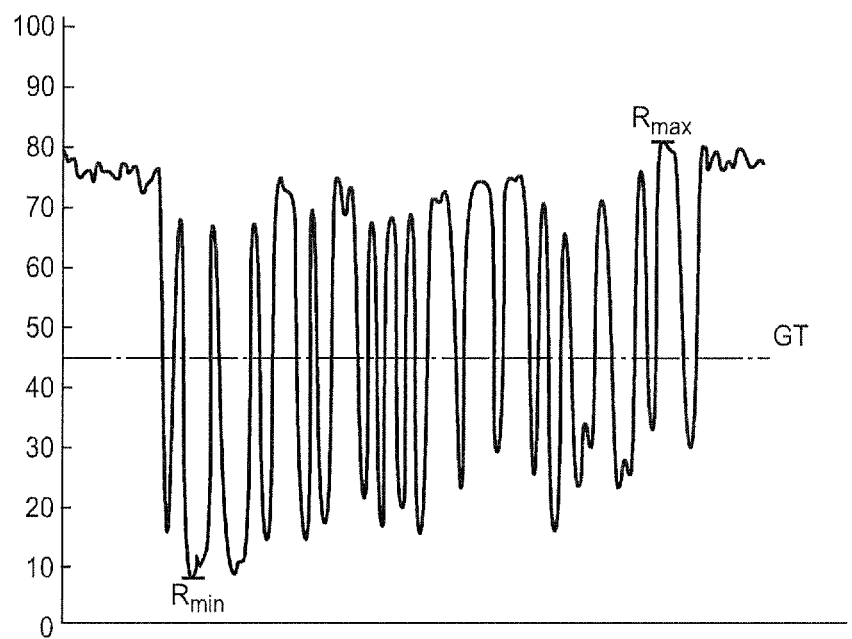
FIG. 11 shows another example of a reflection coefficient waveform of a reflected light beam out of symbol information.

In the cases of the (scanned) reflection coefficient waveforms shown in FIG. 7 and FIG. 9, the level fluctuation of the white level elements (spaces) is greater than that of the black level elements (bars). Therefore, if the maximum reflection coefficient Rmax is used for calculating a conventional binarization threshold GT, the binarization threshold GT is set with a greater value, as shown in FIG. 7, to cause a reading error. On the other hand, in the case of the symbol information reading method of the embodiment according to the present invention, the binarization threshold GT is set with an appropriate value for binarization to improve decoding accuracy.

FIG. 6 is a flowchart showing another example of calculating "the first peak value" in the flowchart shown in FIG. 2.

In the embodiment shown in FIG. 6, the first peak value calculating section 33 extracts any peak value provided with an indicator of being convex upward (a part corresponding to a white level having a high reflection coefficient (a high brightness value)) out of the peak values saved in the image memory 12, and then creates a histogram of peak values being convex upward (S301).

In the case where a histogram of peak values being convex upward includes a plurality of heights, the first peak value calculating section 33 calculates a height (distribution) at which a total frequency has a maximum in the distribution of the histogram (S302).

The first peak value calculating section 33 creates a cumulative frequency distribution of the height area, and then calculates a level value (namely, 66) of a high reflection coefficient at which the cumulative frequency is a half (35) of the ultimate value (the total frequency of 70), and sets a first peak value with the level value of 66 (S303 and S304). On this occasion, it is also possible to set a first peak value with a median or an average of the height area at which the total frequency has a maximum.

INDUSTRIAL APPLICABILITY

Thus, an apparatus and method for reading symbol information according to the present invention enables improvement of decoding accuracy, not being affected by the condition of the reflection coefficient waveform and the kind of symbol information to be read.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1. Symbol information reading apparatus
2. Recording medium
3. Data processor
4. Decoding processor
11. Imaging apparatus
11a. Imaging element
11b. Transfer guide
12. Image memory
21. Barcode
31. Smoothing processor
32. Peak detecting section
33. First peak value calculating section
34. Second peak value calculating section
35. Binarization threshold calculating section

What is claimed is:

1. An apparatus configured to read symbol information comprising:
    a reading means for reading a reflected light beam out of symbol information irradiated with a light beam;
    a peak detecting means for detecting peak values in a reflection coefficient waveform of the reflected light beam read by the reading means;
    a first peak value calculating means for calculating a first peak value according to a peak value at a high reflection coefficient side among the peak values detected;
    a second peak value calculating means for calculating a second peak value according to a peak value at a low reflection coefficient side among the peak values detected; and
    a binarization threshold calculating means for calculating a binarization threshold based on the first peak value and the second peak value,
    wherein the first peak value calculating means calculates the first peak value according to a cumulative frequency distribution of peak values at the high reflection coefficient side.

2. The apparatus configured to read symbol information according to claim 1;
    wherein, if a histogram of the peak values at the high reflection coefficient side includes a plurality of heights, the first peak value calculating means creates a cumulative frequency distribution of a height area at which the total frequency has a maximum, and then calculates the first peak value according to the cumulative frequency distribution.

3. The apparatus configured to read symbol information according to claim 1;
    wherein the binarization threshold is a value calculated by proportionally dividing the first peak value and the second peak value with a predetermined ratio.

4. The apparatus configure to read symbol information according to claim 1, further comprising:
    a smoothing means for removing a faint noise out of the reflection coefficient waveform read by the reading means.

5. A method for an apparatus configured to read symbol information comprising:
    a first step of reading a reflected light beam out of symbol information irradiated with a light beam, and detecting peak values in a reflection coefficient waveform of the reflected light beam;
    a second step of calculating a first peak value according to a peak value at a high reflection coefficient side among the peak values detected;
    a third step of calculating a second peak value according to a peak value at a low reflection coefficient side among the peak values detected; and
    a fourth step of calculating a binarization threshold based on the first peak value and the second peak value,
    wherein the second step includes calculating the first peak value according to the cumulative frequency distribution of the peak values at the high reflection coefficient side.

6. The method for reading symbol information according to claim 5;
    wherein, if a histogram of the peak values at the high reflection coefficient side includes a plurality of heights, the second step includes creating a cumulative frequency distribution of a height area at which the total frequency has a maximum, and then calculating the first peak value according to the cumulative frequency distribution.

7. The method for reading symbol information according to claim 5;
    wherein the fourth step includes calculating the binarization threshold by proportionally dividing the first peak value and the second peak value with a predetermined ratio.

8. The method for reading symbol information according to claim 5;
    wherein the first step includes removing a faint noise out of the read reflection coefficient waveform, and detecting the peak values in the smoothed reflection coefficient waveform.

* * * * *